UNITED STATES PATENT OFFICE.

GUSTAV TÜSCHEL, OF ODESSA, RUSSIA.

PROCESS OF VARNISHING.

SPECIFICATION forming part of Letters Patent No. 705,723, dated July 29, 1902.

Application filed November 16, 1901. Serial No. 82,593. (No specimens.)

*To all whom it may concern:*

Be it known that I, GUSTAV TÜSCHEL, manufacturer, a subject of the Czar of Russia, residing at Altehetzgergasse 28, Odessa, Russia, have invented a new and useful Process of Varnishing and Mending Old Reed Chairs and other Analogous Objects; and I do hereby declare the following to be a full, clear, and exact description of the same.

This invention relates to processes of varnishing; and it consists in an improved process of varnishing adapted especially to be applied in renovating reed chairs and other similar articles.

In carrying out my improved process I mix with fifteen hundred grams of water one thousand grams of chemically-pure white lead, one to two grams of yellow anilin, soluble in water, and one hundred and twenty-five grams of white Russian glue in sticks. This mixture is next boiled together and then applied by means of a brush over the old and unclean reeding of the chair. Three coats or layers are preferably applied, each of the first two layers being permitted to dry before the succeeding coat is applied. Thus treated the reeding may be washed with water without affecting the coating. It should be remarked that the coating is preferably applied while in the heated state.

Having thus fully described my invention, what I claim as new, and desire to secure by Letters Patent, is—

The process of varnishing or coating surfaces which consists in applying to the same in a heated condition a varnish composed of one thousand grams of white lead, fifteen hundred grams of water, one to two grams of yellow anilin, and one hundred and twenty-five grams of stick Russian glue, substantially as described.

In testimony whereof I have signed this specification in the presence of two subscribing witnesses.

GUSTAV TÜSCHEL.

Witnesses:
 CHARLES HONOW,
 GREGORY PHELAN.